United States Patent [19]
Jaquith

[11] 3,978,460
[45] Aug. 31, 1976

[54] TEMPERATURE INDICATING DEVICE FOR FLUIDS

[75] Inventor: Burton Kent Jaquith, Fort Lauderdale, Fla.

[73] Assignee: Technical Industries, Inc., Fort Lauderdale, Fla.

[22] Filed: Mar. 28, 1975

[21] Appl. No.: 563,187

[52] U.S. Cl. .......................... 340/227 R; 340/228 R; 119/14.14; 73/343 R
[51] Int. Cl.² ...................... A01J 7/00; G08B 21/00
[58] Field of Search ......... 340/227 R, 227.1, 228 R, 340/421; 119/14.14; 73/362 R, 343 R; 219/448, 449, 450

[56] References Cited
UNITED STATES PATENTS

| | | | |
|---|---|---|---|
| 3,824,579 | 7/1974 | Waseleski et al. | 340/228 R X |
| 3,884,187 | 5/1975 | Massie et al. | 119/14.14 |

*Primary Examiner*—John W. Caldwell
*Assistant Examiner*—William M. Wannisky
*Attorney, Agent, or Firm*—James J. Mullen

[57] ABSTRACT

A temperature indicating device for use with a conduit system wherein a fluid material is moved and is weighed by a continuous weighing mechanism comprising (a) an adapter which is partially shaped to be detachably connected to said continuous weighing mechanism and incorporated into said conduit system on that portion of said continuous weighing mechanism where the fluid material passes therefrom, said adapter being provided with a nipple in the side wall thereof; (b) a sensing probe which is slideably mounted within said nipple, said sensing probe extending throughout the entire length of said nipple and into the interior portion of said adapter whereby the sensing probe will be in thermoconducting relation with the fluid material moving through said adapter; (c) a control module containing input and output circuits, disposed remotely from said sensing probe and interconnected therewith by suitable electrically conductive means, said control module adapted to receive a signal from said sensing probe via said input circuit and upon preset circuity conditions, energize an outside electrical power supply such as alternating current lines through said output circuit.

18 Claims, 18 Drawing Figures

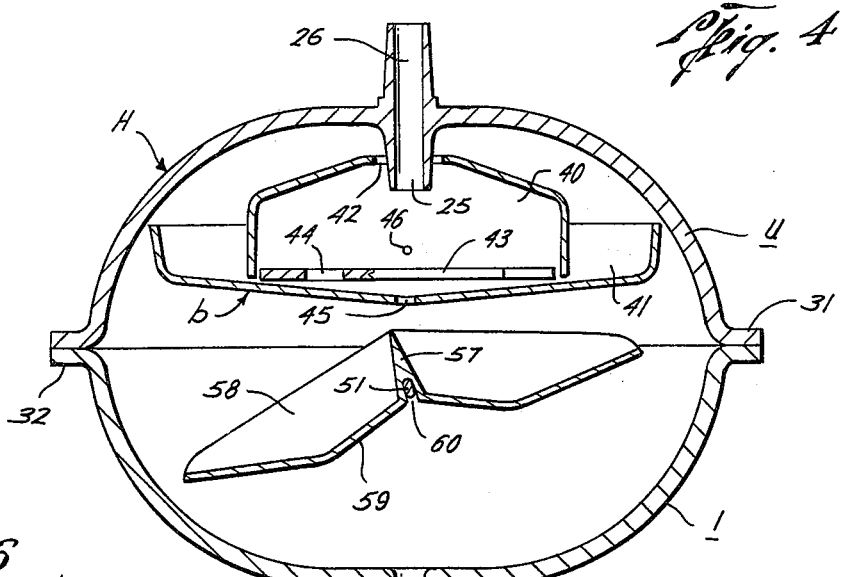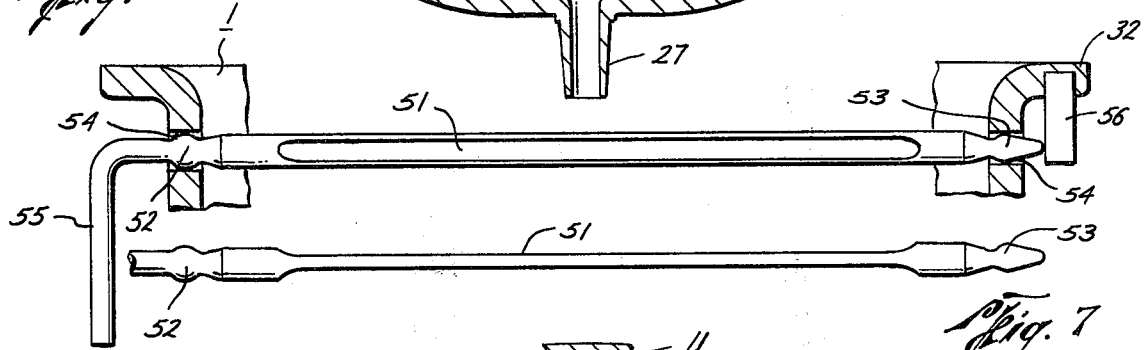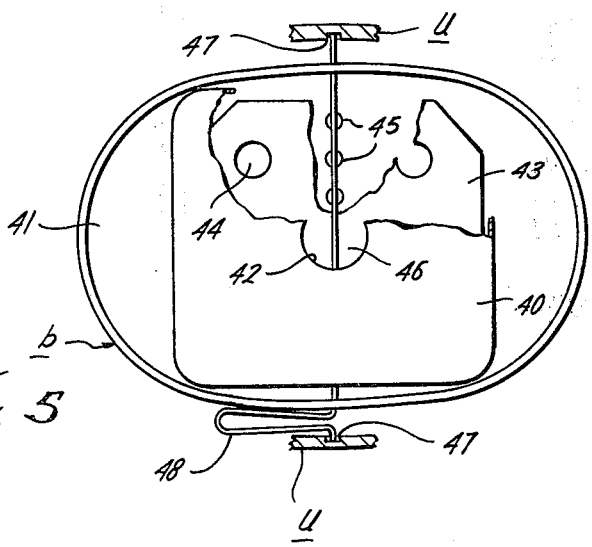

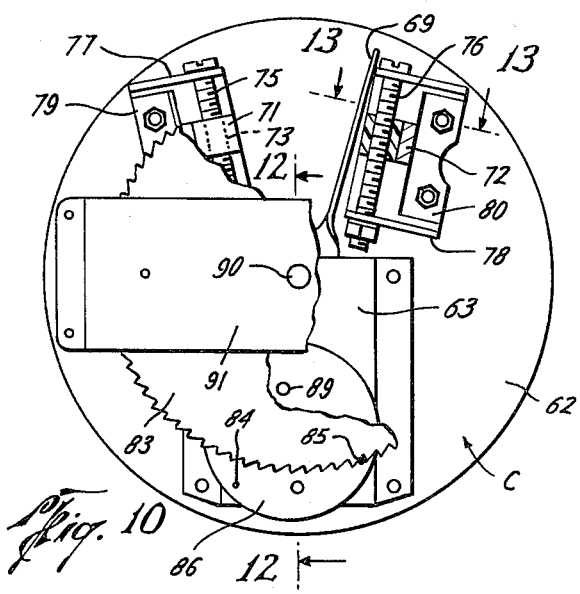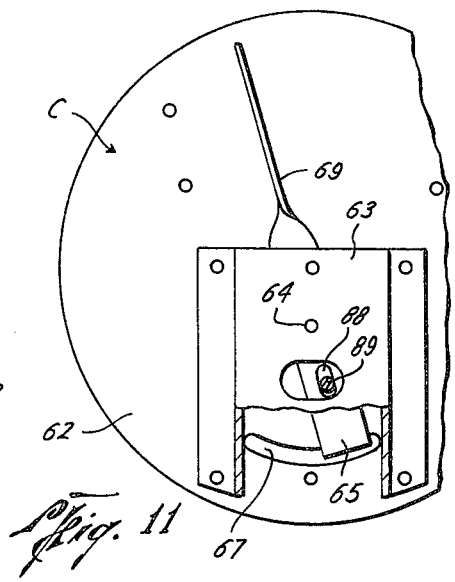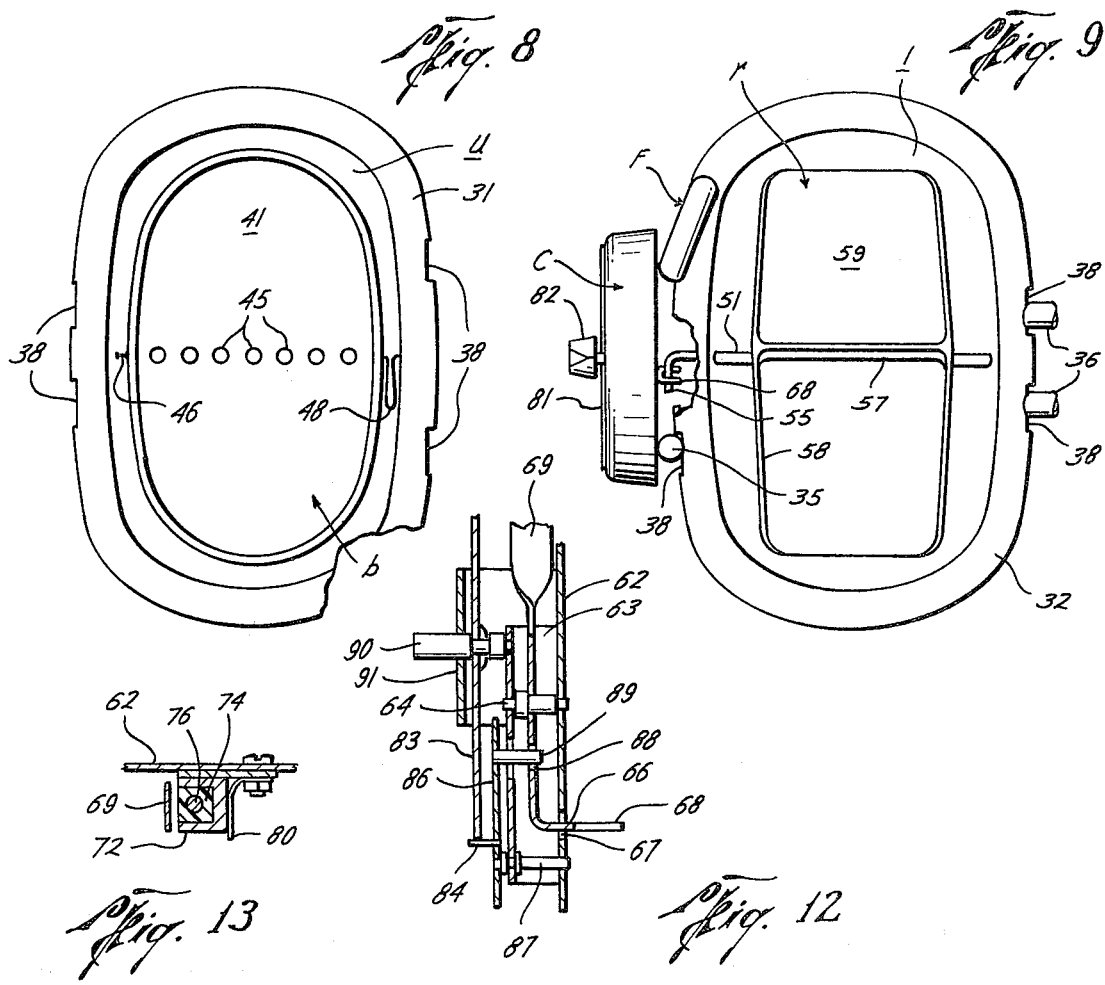

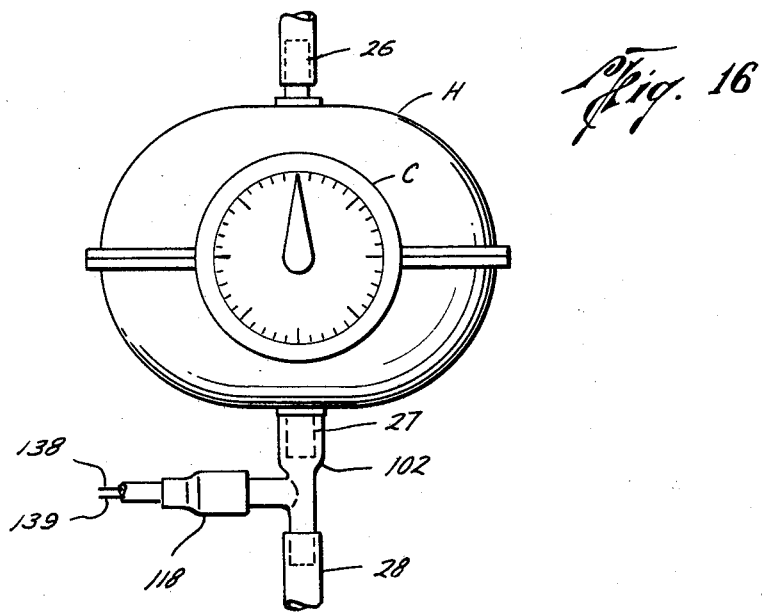
Fig. 16
Fig. 17
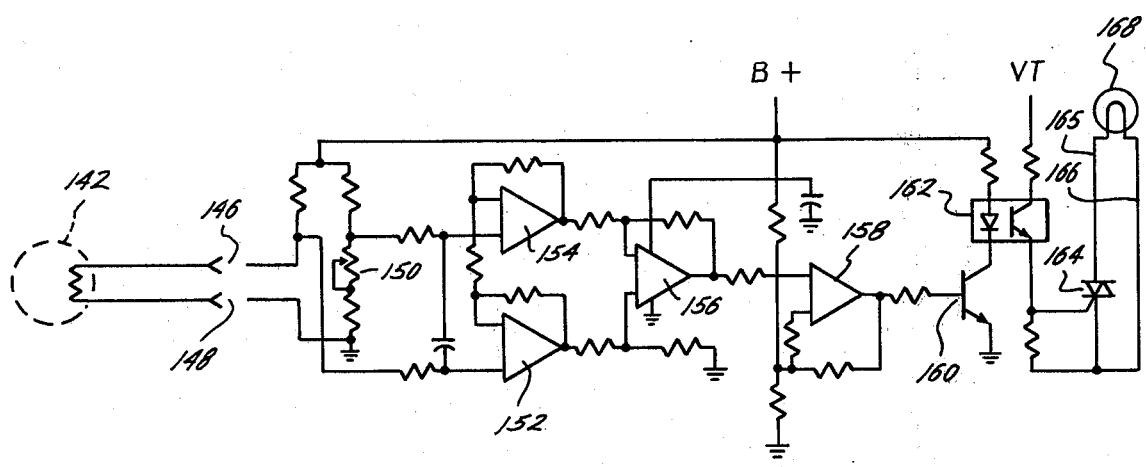
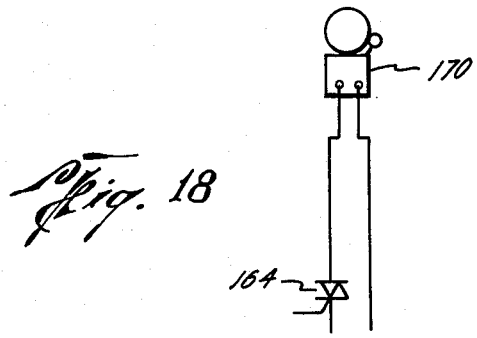
Fig. 18

TEMPERATURE INDICATING DEVICE FOR FLUIDS

CROSS REFERENCES TO RELATED APPLICATIONS

This patent application is related to patent application Ser. No. 563,093, filed concurrently with the instant application on March 28, 1975 and to patent application Ser. No. 569,297, filed April 18, 1975, all by the same applicant and commonly assigned.

BACKGROUND OF THE INVENTION

The present invention relates in general to a temperature indicating device for fluids and which is used in combination with a scale mechanism for weighing fluids while in continuous motion. More particularly, the present invention relates to milk collection systems and means to monitor the body temperature of a cow during the milking operation. The present invention more preferably relates to the use of a temperature indicating device in combination with a gravimetric weighing mechanism to create an accurate and simple means of detecting elevated temperatures in animals being milked.

In conjunction with the description contained herein, it is to be understood that the present invention has applicability to numerous types of materials in motion including liquids ranging widely in viscosity and characteristics, granular substances capable of fluid motion and various combinations thereof. However, as a specific example, the subsequent description will be concerned with milk in its flow from a cow through a conduit system which includes a milking machine, a weighing mechanism for said fluids, a collection container and a vacuum pump which exerts a subatmospheric pressure in the overall system.

In conjunction with the milking of animals such as cows, one of the basic problems relates to the early detection of a cow's body temperature which can indicate abnormal temperature increases resulting from infections such as mastitis or the onset of a period of estrus indicating the cow will be ready for breeding.

If the temperature of a cow can be detected by such a screening device the early stages, medication can be far more effective than the detection from visual means after inflammation has caused damage or through swollen udders and the like. Similarly, the detection of temperature increases above the normal diurnal cycles in a healthy animal can indicate the animal is becoming ready for breeding and if not detected visually, a nonproductive time will then ensue until the animal's next period of breeding. Previous attempts to monitor the animal's temperature have been less than adequate. For instance, the prior art has suggested that one of the principal difficulties is the lack of recognition of where an adequate and precise temperature measurement of the animal, such as the animal's milk, can be carried out. For instance, it has been suggested by the prior art that the temperature of an animal's milk, such as a cow, be monitored within the milking machine apparatus per se; note, U.S. Pat. No. 3,022,766.

One of the problems in conjunction with the utilization of temperature indicating devices associated with the milking machines per se is that one essential part of the milking machine is the introduction of air bleed to move the milk through the vacuum conduit system in the collection vessel or pipeline. Since this air introduction is a relative constant and the milk flow from the animal is a variable, the full effect of flow of air and air mixture with milk substantially reduces the relative accuracy of temperature monitoring devices being utilized. Consequently, it can thus be seen that there is a need in the art for a temperature indicating device as used in combination with the conduit system in order to overcome the disadvantages heretofore set forth.

Accordingly, it is one object of the present invention to provide a temperature indicating device which is simple in construction but is highly effective when utilized, for example, in a fluid conduit system.

Another object of the present invention is to provide in combination, a continuous weighing mechanism for fluids and a temperature indicating device associated with said weighing mechanism.

A salient object of the present invention is to provide an improvement to a typical milk collection system by the utilization of the combination of the continuous weighing mechanism and the temperature indicating device.

A further object of the present invention is to provide an apparatus for the constant monitoring of the animal temperature during the initial milking period to detect abnormal temperature resulting from infection and/or breeding conditions.

These and other objects of the present invention will be readily apparent from the subsequent description including the claims and drawings.

BRIEF DESCRIPTION OF THE INVENTION

The disadvantages heretofore mentioned in conjunction with the prior art are overcome by the present invention which comprises in one part a temperature indicating device and in another part the combination of the temperature indicating device and a continuous weighing mechanism for fluids, preferably a gravimetric operated apparatus. The temperature indicating device in general comprises an adapter which is detachably maintained on the outlet of said weighing mechanism. The adapter is fitted with a nipple on the side thereof and which nipple is provided with a slideably mounted sensing probe. The sensing probe extends throughout the entire length of the nipple and into the interior portion of the adapter whereby the sensing probe will be in thermoconducting relation with the fluid material moving through said adapter. The temperature indicating device is self-contained with suitable connectors on each end comprised of a thermistor incapsulated in a closed tube (such as stainless steel) and which projects into the fluid flow.

The shielded connector cord terminates in a plug assembly on the opposite end of the line with an adjustable resistance included to provide means for the calibration of each individual probe. This facet is an essential part of the device in that the complete disassembly of the milk collection system or portions thereof for cleaning is necessary for sanitation purposes and therefore each device must be independent and individually accurate to its level of calibration since as a practical matter there is no assurance that a specific device will be interconnected with a specific control module (herein defined) or recording device in subsequent milkings. The opposite end of the sensing probe terminates as previously mentioned with a connector which in turn is adapted to be fitted into a control box in a female-male type (receptical/plug) relation. Within the control box, a "mother" board is adapted to connect a solid state electronic monitoring circuit (control module) which in turn has its own calibration means to assure the interchangeability of these "temperature sensing" control modules independent of the sensing probe. The control module is so designed in circuitry that a precise level of temperature can be immediately detected; thus, a temperature over the pre-calibrated values actuates AC lines and subsequently energizes a visual indicator, monitoring recorder or the like.

It has been found that the temperature indicating device used in conjunction and in combination with the continuous weighing mechanism provides an extremely accurate means of detecting elevated temperatures in animals being milked.

IN THE DRAWINGS

The present invention is more clearly understood from the subsequent detailed description taken in conjunction with the accompanying drawings which illustrate as a specific example embodiment of this invention as designed for and applied to a typical closed conduit system starting with the claw at the udder of a cow and ending with a receptical wherein milk is collected.

It is to be understood that FIGS. 1–13 will be a type of continuous weighing mechanism which can be utilized in the present invention and which has been modified to show the present invention as pointed out in FIGS. 14–18.

Accordingly, in the drawings:

FIG. 4 is an enlarged vertical section through the mechanism housing, taken on line 4—4 of FIG. 3, the supporting frame for the weighing mechanism being omitted from the view for clarity of illustration;

FIG. 5 is a top plan view of the baffle unit per se, portions of adjacent walls of the housing upper shell being shown in horizontal section;

FIG. 6 is an enlarged detail in side elevation of the rocker shaft shown in relation to certain openings in the walls of the housing (exhibited in section) wherein it is journaled for oscillatory movements;

FIG. 7 is a top elevation of the same shaft;

FIG. 8 is a bottom plan view of the housing upper shell together with the baffle unit positioned therein;

FIG. 9 is a top plan view of the housing lower shell together with the supporting frame therefor and the rocker tray therein;

FIG. 10 is a front elevational view of the weight control and counter device from which the dial and face plate are omitted to exhibit other parts therebehind;

FIG. 11 is a similar view with the counter escapement wheel removed to expose additional parts, the magnets being also omitted from the view;

FIG. 12 is a detail in section, taken on line 12—12 of FIG. 10;

FIG. 13 is a similar view, taken on line 13—13 FIG. 10;

FIG. 16 is a front elevation of a continuous weighing mechanism in combination with the temperature indicating device and which shows the present invention as opposed to the prior art shown in FIG. 2, without structural support;

FIG. 17 is a schematic of the circuitry used in conjunction with the temperature indicating device, and FIG. 18 is another embodiment showing a bell as opposed to a light of FIG. 17.

DETAILED DESCRIPTION OF THE INVENTION

Figure 1:
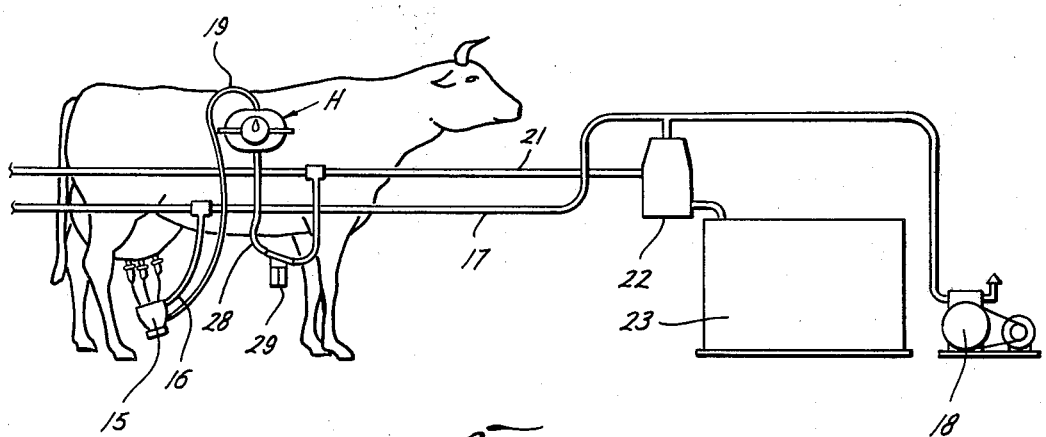
FIG. 1 illustrates more or less diagrammatically a typical milk conduit system of the general kind with which a weighing mechanism may be advantageously used.

In FIG. 1, there is illustrated a closed conduit system through which a pulsating fluid is drawn in response to operation of a vacuum pump. Such a system is more or less common with present day milking machines. It comprises a claw 15 having teat cups applicable to the udder of a cow and provided with a flexible connection 16 leading to the air line 17 and a vacuum pump 18; also a flexible connection 19 leading to the housing H of the weighing mechanism which is interposed in the milk line 21 leading to a releaser 22 (for separating air from the milk) en route to the tank 23 wherein the accumulating milk is refrigerated and stored. Into and through such a conduit system which is closed and wherein a subatmospheric (minus) pressure is constantly maintained, the milk is drawn while pulsated in response to operation of the vacuum pump. To determine accurately the weight of the milk delivered at the source, i.e. the yield of the cow, while the milk is passing uninterruptedly to the storage tank, is the primary function of the weighing mechanism in the particular environment illustrated in FIG. 1.

Figure 3:
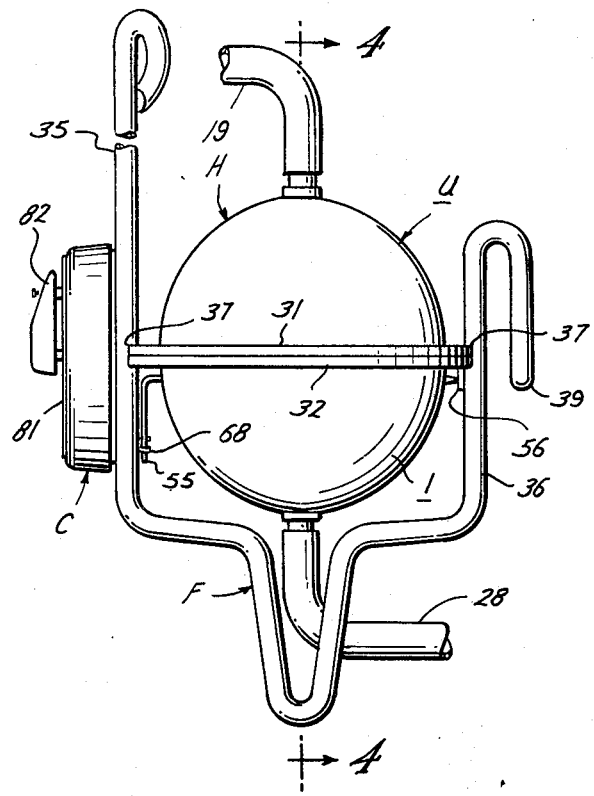
FIG. 3 is a side elevation thereof.

The weighing mechanism enclosed within the housing H comprises two complementary bowl-shaped shells, one upper u and one lower 1, defining between them an elongated closed chamber through which the fluid material is continuously circulated while weighed. At the top of the upper shell u is an inlet in the form of a nipple extending both inwardly of the chamber at 25 and outwardly thereof at 26 to facilitate connection therewith of the flexible pipe 19 (FIG. 1) leading to the conduit through which is flowed the fluid material to be weighed. An outlet nipple 27 provided at the bottom of the lower shell 1 may be joined as by a flexible connection 28 (FIG. 1) to the conduit line 21 to deliver the weighed material to the point of its discharge, such as the tank 23. A sampler 29 interposed in the connection 28 retains a true proportionate sample of the fluid material convenient for testing. Along their meeting edges the two shells are provided with out-turned flanges 31 and 32 which interengage to form a tight joint there between. A supporting frame F for the housing H is also provided and, as shown, this comprises a bar of round cross section bent to provide two pairs of spaced vertical legs front and rear, 35 and 36, respectively, arranged to receive between them the upper and lower shells u and 1 of the housing. These four legs are notched at 37 at points where they may engage coacting notches 38 in the out-turned shell flanges 31 and 32 to seecure the two shells closely and firmly together (FIG. 3). The upper end portions of the two rear legs 36 which are integral are formed into a down-turned hook 39 to facilitate attachment of the frame F and housing H to a bracket (not shown) affixed to the pipe stanchions or pipe lines which are commonly provided in milking parlors.

The upper shell u accommodates within itself a baffle unit 1 which, as shown, comprises an open-bottom baffle box 40 whose depending walls rest upon a baffle drain pan 41. At its top center the baffle box is apertured at 42 where it loosely surrounds the depending nipple 25 is spaced relation thereto. A baffle plate 43 which is confined within the depending walls of the baffle box 40 and rested loosely upon the baffle drain pan 41 is formed with openings 44 through which fluid material may drain into the pan. The baffle drain pan 41 itself is elongated in general conformity with the contour of the housing shells, and its bottom is pitched from opposite ends downwardly to its low point in the center which takes the form of a transversely extending shallow gutter wherein a plurality of aligned drain openings 45 are provided. The baffle unit *b* wherein the incoming fluid first enters serves as a receiving station wherein deaeration and depulsing of the material takes place. While halted at this station, the fluid body is quieted and relieved of any entrapped air whose presence would otherwise tend to prevent a smooth even flow thereof. This is important in order that the scale mechanism presently to be described may function accurately and speedily.

The fluid material upon leaving the baffle unit b descends through the drain openings 45 into a lower part of the housing chamber along a line which extends transversely thereof at the longitudinal center of the housing. To support the baffle unit in place, an elongated pin 46 is extended between opposite walls of the upper shell *u* and through like walls of the baffle box 40 and baffle pan 41 wherein suitable openings are provided for the purpose. Opposite ends of this pin are rested within sockets 47 formed on the inner faces of the upper shell u to provide support for the pin and its associated parts. One end portion of the pin (FIG. 4 and 8) is formed into a spring handle 48 which, when compressed, pushes the opposite pin end portions away from each other for secure engagement within the supporting sockets 47; this handle also facilitates manipulation of the pin whenever the baffle unit *b* is to be disassembled or reassembled for replacement within the housing. Manifestly each of the parts comprised in the baffle unit may be readily separated from the others for facile cleaning and sanitizing.

Within the lower shell 1 is a scale receiver *r* movable through a fixed path. In the embodiment shown, this receiver is in the form of an elongated tray mounted at its center point upon a rocker shaft 51 extending transversely of the housing. For the major portion of its length, through its center portion the shaft 51 is flatted but opposite end portions are rounded out and formed into ovals or balls 52 and 53 of unequal diameters, each adapted for circular line engagement within aligned, closely surrounding, cylindrical bearings in the form of openings 54 which extend through the walls of the lower shell l. The oval 52 is slightly larger in diameter than is the oval 53 and the shaft end portion proximate thereto is turned transversely of its axis of oscillation to provide a crank arm 55. The opposite shaft end proximate to the smaller oval 53 abuts a post 56 which depends from the flange 32 of the lower shell l, the purpose being to provide an end thrust bearing therefor. In periods of nonoperation the shaft may freely be removed from the lower shell l by an endwise movement in a direction away from the post 56; but with the vacuum pump in operation to draw milk through the conduit system a sufficient minus pressure is maintained within the two shells of the housing H whereby the higher external pressure exerts a force upon the larger oval 52 in excess of that upon the smaller oval 53 to hold the shaft in the endwise position shown in FIGS. 3 and 6 where it is engaged with the post 56.

A partition wall 57 traversing the rocker tray r centrally thereof is joined to side and bottom walls 58 and 59, respectively, thereby to define two fluid-tight compartments of identical capacity. The base of the partition wall 57 is widened to accommodate for its length a slot 60 open along its bottom to rest upon the flatted portion of the shaft 51 with whose opposite faces it is engaged nonrotatably. The cylindrical end portions of this shaft are disposed outwardly of the tray side walls 58 and serve as means to prevent shifting of the tray upon the shaft endwise thereof. The shaft-tray assembly is exactly balanced but with capacity for rocking movement between two fixed positions in either of which the bottom of the tray compartment which is down will be inclined downwardly, to rapidly spill through its open end the fluid load that has previously been deposited therein.

FIG. 4 illustrates the receiver r in discharge position for the compartment at its lower (left) end. While so positioned, the partition wall 57 is also inclined to the left so that its upper edge is disposed to the left of the drain openings 45 in the gutter of the baffle drain pan 41 thereabove; material flowing by gravity through these openings will accordingly be discharged into the tray upper compartment (to the right as shown in FIG. 4). Filling of this upper compartment starts after emptying of the lower compartment to the left has been well under way. All the fluid material in the lower (left) compartment will, therefore, be discharged therefrom before any considerable filling of the upper (right) compartment has taken place. By providing drain openings 45 of an aggregate area requisite for proper regulation of the flow of material passing therethrough, a complete emptying of the discharging (down) compartment can be assured before a predetermined weight of the material can accumulate within the receiving (upper) compartment. By this means each filling of the upper compartment will proceed to the point of depositing therein material having a predetermined weight so that it is possible to ascertain, with the aid of an accumidating counter device C (hereinafter described), the exact quantity of material, by weight, which has flowed through the gutter openings 45 to move the receiver *r* through its cycles during the entire period of operation.

With continued discharge of material through the gutter openings 45, the two-compartment scale receiver *r* is repeatedly operated through its cycle to move between two positions in one of which the filled compartment is emptied and the other filled (but with very little time loss), and vice versa. However, the factors of speed and of accuracy must be constantly reckoned with, and without the provision of certain means to fix the time requisite for movement of the receiver r between its two positions, the weighing mechanism would probably fall short of meeting many industrial requirements. The provision of such control means will now be described.

Affixed to the front legs 35 of the frame F is a mounting plate 62, which carries a weight control and counter device C. This plate also supports a U-shaped bracket 63 whereon is pivotally mounted at 64 a magnet arm 65 in the general form of a strip. One end portion 66 of this arm is laterally turned to extend rearwardly through an arcuate slot 67 that is formed in the plate 62; the end 66 so projected through the mounting plate is bifureated at 68 to receive the crank arm 55 of the receiver shaft whereby to transmit oscillatory movements thereto. The opposite end portion 69 of the magnet arm 65 is twisted through 90° to present its flat faces in confronting relation to a pair of spaced permanent magnets 71 and 72, each of U-shape in cross section (FIG. 13) to accommodate a fixed plastic core. Through these cores 73 and 74 are extended traversing adjusting screws 75 and 76 which are rotatably supported in brackets 77 and 78, respectively. The axes of the screws 75 and 76 diverge from a point lying in a vertical plane which approximately intersects the pivotal axis 64 of the magnet arm 65, and at a point somewhat therebelow. By this arrangement the end portion 69 of the magnet arm is free to swing between the two magnets through a movement range that is determined by the brackets 77 and 78 which serve also as stops therefor. Angled spring strips 79 and 80 extending parallel with the adjusting screws 75 and 76 maintain a pressure engagement with the two magnets 71 and 72 in all adjusted positions thereof to prevent any loose play upon their mountings and assure against any deviation from the exact positions wherein they are adjusted.

FIG. 10 shows one position of adjustment wherein the brackets stop the end 69 of the magnet arm at points slightly spaced from the two magnets; by adjusting the screws 75 and 76 each magnet may be raised or lowered, and in consequence brought further toward or away from the magnet arm end 69 to thereby vary the air gap therebetween. It is possible, therefore, to increase or decrease the effective magnetic forces operable upon the magnet arm end 69 to influence its oscillations between the two bracket stops 77 and 78. This is important because this adjustment is the control over the weighing properties of the mechanism herein described.

Figure 2:
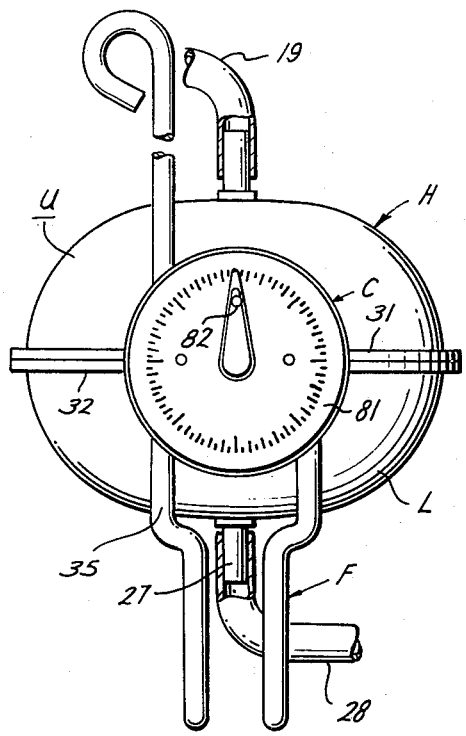
FIG. 2 is a front elevation of a weighing mechanism per se.

The counter device C may be of any approved type. The one here illustrated is equipped with a circular dial 81 around which a pointer 82 is moved to register, by weight, the quantity of fluid material that is passed through the weighing mechanism (FIG. 2). This counter device comprises a toothed escapement wheel 83 certain of whose teeth are alternately engaged by a pair of pins 84 and 85 extending from a pawl 86 at the end of a shaft 87 which is pivotally supported by the mounting plate 62 and bracket 63 (FIGS. 10–12). Oscillatory movements are transmitted from the magnet arm 65 wherein is a slot 88 engageable by a pin 89 which is extended therethrough from the pawl 86 for operation thereof. The escapement wheel 83 is frictionally secured upon a shaft 90 which is rotatably supported upon the bracket 63 and upon a second outer bracket 91 which is carried upon the mounting plate 62 (FIGS. 10 and 12). At its outer end the shaft 90 carries fast the pointer 82 to advance the same around the dial 81. This pointer 82 may be manually reset to zero whenever desired, the escapement wheel then standing still while the shaft 90 is rotated to permit of such adjustment. By the means described, each movement of the receiver r transmits motion to the escapement wheel 83 to rotate it through the distance of one tooth and advance the pointer accordingly. The operating parts of the counter device C may be enclosed within a suitable case as is commonly done with such instruments.

The particular materials used for the different parts of the weighing mechanism should be carefully chosen with due regard to the nature and characteristics of the fluids to be circulated therethrough. For example, if milk be the fluid, then the important considerations of non-toxicity and sanitation will rule out many materials as unfit. Stainless steel is generally approved in this industry, and also certain plastic materials. For lightness, cleanability, and general serviceability the plastic known as methyl methacrylator polymer is entirely satisfactory for the two shells of the housing H, the baffle unit b and the receiver r. The property of lightness in relation to weight which inheres in such a plastic makes it especially desireable for the receiver with a view to minimizing its weight and consequent inertia when in operation. Inasmuch as this material is somewhat flexible, the walls of the housing H (if then, as is desirable for purposes of weight reduction) will undergo flexure in response to operation of the vacuum pump, thereby tending to misalign the axes of the two cylindrical bearings 54.

Any such flexure would tend to create a binding pressure on the shaft 51 whose end portions are journaled for oscillatory movements therein. Any such effect is obviated, however, by rounding outwardly the shaft end portions into the two ovals or balls 52 and 53 which maintain a continuous circular line engagement within their bearings even though the housing walls may undergo flexure during periods of operation while maintaining their close fit within the supporting bearings therefor. For the baffle unit pin 46 and receiver shaft 51, stainless steel is an approved material where milk is the fluid to be weighed. Manifestly, where other and different fluids are to be passed through the weighing mechanism, there is a wide choice of materials available for the housing and all operating parts therewithin, provided only that they meet all the requirements, atmospheric and otherwise, imposed by the special conditions encountered in their use.

To attain a high degree of accuracy in the weighing operation, it is important that the factor of inertia in all movements of the scale receiver r be held to the minimum, and also that adjustable means, additional to gravity, be provided to accelerate and control all movements of the receiver between its receiving and discharging positions. The very light weight of the balanced scale receiver is relied upon to cancel out most of the inertia, and the provision of the pair of co-acting magnetic means 69 and 71 (or 72) serves effectively to speed the movements of the receiver between its two positions. The influence of the coacting magnetic means may readily be varied by proper adjustment of the adjusting screws 75 and 76, one or both of them, to widen or narrow the air gap between them thereby affecting the time interval required for operation of the receiver r through its cycle. Each movement of the receiver r is controlled by the magnets 71 and 72 and therefore the subsequent weight of that measure of fluid. In effect, the weight of the fluid in the one compartment of the receiver r is suspended by the magnetic attraction of the magnet 71 (or 72) for magnet arm 69 through the interconnected mechanical linkage previously described. Since one of the inherent properties of a permanent magnet is a rapid and increasing reduction of magnetic attraction with only a slight increase in air gap, a relatively slight movement of the magnet arm 69 by the accumulated fluid reaching the predetermined weight supportable by the magnetic attraction, for all practical purposes leaves the filled receiver compartment unsupported.

While the movement of the receiver r is relatively rapid, it is accelerated through its arc of travel since the movement of fluid toward the end of the compartment is continually moving the center of gravity of the contained fluid toward the discharge end of the receiver compartment. At the end of travel the fluid will completely drain from the receiver r with the opposing magnet then supporting the opposite compartment. It is the air gap between the magnet arm that determines the weight of the fluid contained in each compartment, and therefore the increase or decrease of that air gap, by adjusting movement of the screws 75 and 76, is the means of calibration to the desired weight. In practice, each movement of the receiver which is of a relatively short range starts off very fast and proceeds at an accelerating pace so that the fluid material entering the baffle means b of the housing is enabled to maintain a continuous flow therefrom into and out of the receiver r and on through the conduit system, all without interruption or variation in its flow rate while undergoing a concurrent weighing operation.

The frame F can be made of any suitable material, however, it is desirably produced from an aluminum (or aluminum alloy) bar which is readily fashioned into the form herein described. Its front and rear legs have sufficient spring properties to securely hold the two housing shells u and l in assembled relation and, when spread further apart slightly, to release the shells for disassembly of all working parts of the weighing mechanism. The weight control and counter device C which is operatively connected to the receiver shaft crank arm 55 by the bifureated slot 68 of the magnet arm 65 will readily disengage therefrom when the frame front legs 35 are pulled outwardly to release the housing H for removal from the frame F; conversely, when the lower shell l, complete with its receiver r in place, is reassembled with the upper shell u within the frame, the shaft crank arm 55 is free to reenter the bifureation 68 of the magnet arm 65, thereby restoring the operative connection therewith, all with a minimum of time and effort. This is important inasmuch as it facilitates the operation of cleaning the various working parts, of the weighing mechanism which, in many cases, is required, at least, periodically. The overall dimensions of the weighing mechanism are small, due largely to the simplicity and fewness of its several components and to the materials selected for the construction thereof, and its ready portability is attested by the fact that the weight of the entire mechanism complete, as commercially produced for the dairy industry, may be held to less than 5 lbs.

In summary then, the foregoing description sets forth one embodiment which provides a means which permits a weighing mechanism to operate continuously upon a fluid stream of indefinite length, moving at even speed or otherwise, while contained in a conduit system, for conditioning the fluid, when necessary, to assure an even and quiet flow thereof into and out of a gravity operated scale receiver, and for exercising close control over the quantity, by weight, of fluid that is accepted into the receiver for each operation thereof, all without any deviation from the normal flow rate of the fluid moving through the conduit system. Because of the several features herein disclosed, this weighing mechanism which is compact, light and inexpensive is able to meet exacting requirements in numerous industries and provide a high degree of accuracy in the weighing of many different fluids.

It is to be understood that any type of weighing mechanism including the foregoing described mechanism (and any improvements thereof) can be used in the present invention.

In conjunction with FIGS. 1–13, these represent to some degree the prior art and are illustrative of a type of weighing mechanism which can be utilized in combination with the temperature indicating device, both of which in combination constitute the present invention and both of which in combination with the overall fluid conduit system constitute another facet of the present invention. As previously mentioned, other weighing mechanisms can be utilized herein and even improvements to the above described mechanism such as those set forth in U.S. Pat. NO. 2,917,926 may be employed.

Figure 14:
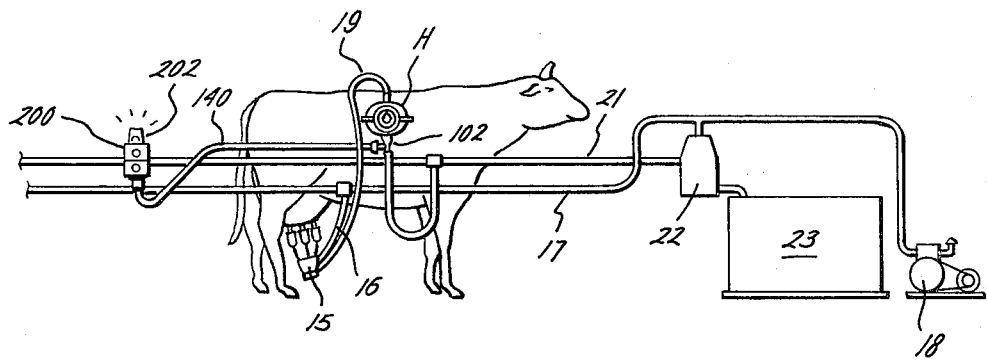
FIG. 14 illustrates more or less diagrammatically the improved fluid conduit system incorporating the temperature indicating device in combination with the continuous weighing mechanism.

Referring now to FIG. 14, this Figure shows the present invention incorporated into a fluid conduit system. The reference numbers of less than 91 are the same as those indicated in FIGS. 1–13. Thus, there is shown in FIG. 14 a cow being milked with milking machine 15 and fitted with line 16 which employs a vacuum thereon through line 17 via containers 22 and 23 and vacuum pump 18. The continuous weighing mechanism H is shown being fed through conduit 19. The weighing mechanism H has been modified by the incorporation of the temperature indicating device 102 positioned beneath thereof in order to accurately detect the flow of milk from said mechanism and transmitted through wiring 140 to control box 200 containing a light 202 which is activated in the event of an increase in temperature.

Figure 15:
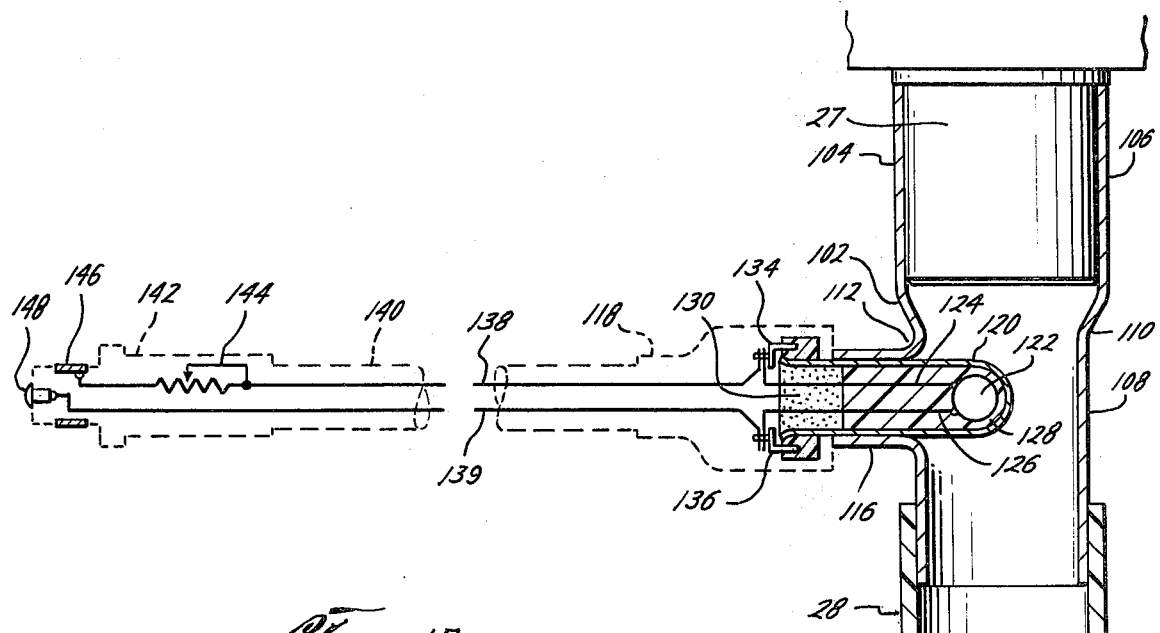
FIG. 15 is an enlarged detail in side elevation of the temperature indicating device and which is shown connected to the bottom portion, i.e. outlet, of a continuous weighing mechanism.

FIG. 15 more specifically shows a portion of the temperature indicating device which comprises an adapter 104 having an upper portion 106 which is detachably connected to outlet 27 from said weighing mechanism. While one embodiment is shown and constitutes a friction type fitting, it is to be understood that other means such as a threaded connector may be employed and are thus within the scope of the present invention.

Adapter 104 has a lower portion 108 which is smaller in cross-sectional area than the upper portion 106. This restriction or reduction in size is shown by the indented portion 110 and such reduction in size permits a directed flow of the fluid moving there through onto the sensing probe housing 120. Adapter 104 is so shaped that there is provided a nipple 116 which is substantially perpendicular to the adapter per se. While this nipple 116 is shown being formed starting with that portion 112, it is to be understood that other means of connecting the probe to the adapter may be employed. Such means could include a threaded connector.

In the lower portion 108 of adapter 104, there is shown conduit 28 which is attached thereto and which conduit provides the means by which the fluids travel through said system to a collection container 23.

The sensing portion of the temperature indicating device comprises a sensing probe 118 having contained partially therein and extending outwardly a sensing probe wall 120 containing a thermistor 122 having thermoconducting wires 124 and 126 attached thereto and all of which are embedded in a heat conductive jelly 128. The heat conductive jelly 128 is retained in the said housing 120 via an adhesive 130. Surrounding the exterior housing 120, which is contained within the sensing probe 118, is terminal block 132, such as a glass filled polyester cast. This terminal block 132 in turn is provided with terminals 134 and 136 which are adapted to receive wires 124 and 126 and also wires 138 and 139, and which wires 138 and 139 are conductors to transmit a signal through cable 140 to a second connector 142 located on the opposite end from the sensing probe. This connector 142 in turn houses conductor lines 138 and 139 and also a trimming resistor 144 connecting points 146 and 148 as shown.

Referring to FIG. 16, the combination of the weighing mechanism and temperature indicating device is shown in general.

Referring to FIG. 17, there is shown the connector 142 with connecting points 146 and 148 leading to a solid state circuitry which in one preferred embodiment constitutes a solid state circuit board which is referred to herein in general as a "control module".

Referring again to connector 142, the trimming resistor 144 functions for calibration purposes. Specifically, the calibration resistor permits the standardization of the entire probe assembly for an exact ohms resistance relationship to temperature as sensed by the thermistor 122 and as such compensates for the temperature differential between the true body temperature of, for instance, a cow, and the milk at the probe.

Referring again to FIG. 17 and the control module, this comprises a trimming resistor 150 which functions as a compensating or calibrating means for the incoming signal to standard value resistance. The calibrated incoming signal is then amplified by three operational amplifiers 152, 154 and 156. This signal is then applied to one input of a fourth operational amplifier 158 which is configured as a comparator which detects a predetermined set point. This signal then passes to a control transistor 160 which on signal will energize an optical coupler 162 permitting a pilot voltage VT to be impressed through to a (thyristor) triac 164 and which as a result thereof activates the alternating current power lines 165 and 166 thus energizing a secondary device 168 such as a light 202, bell 170 (see FIG. 18) or the like.

It is within the scope of the present invention that the actuation of power lines 165 and 166 can automatically function to 1. turn on a red warning light, 2. stop the milking operation, 3. dye-spray the cow's flank, and/or 4. open a power exit gate.

In a preferred embodiment of the present invention, the actuation of power lines 165 and 166 turns on a red warning light such as shown in FIG. 14 and as indicated by 202.

In summary then, the present invention permits the constant monitoring of an animal's temperature during the initial milking period to detect abnormal temperatures resulting from infections or breeding conditions. The appropriate output of the detection will give a visual or recorded means readily available to the plant operator and automated mechanical equipment can thereafter be actuated for the physical segregation, for example, of the milk from any defective or substandard milk as well as marking and segregation of the animal.

In practice, the present invention combination has resulted in a very unique, accurate and effective means to achieve the results heretofore set forth. For example, it has been found with the utilization of the continuous weighing mechanism and temperature indicating device that when one quarter pound increments of milk are continuously discharged from the weighing mechanism, the sensing probe, even operated under vacuum conditions, can detect a temperature differential, for example, 102.5°F. (indicating a fever) as opposed to, for example, a normal temperature of 99.5°F. to about 100°F.

In another facet of the present invention, the control module (solid state circuit board) is adapted to be contained in a housing such as a control box 200 fitted with (1) a "mother board" which includes a voltage transformer VT and (2) a "warning" light 202. The control module is detachably connected to the "mother" board which is suitably adapted to receive the signal from the sensing probe and transmit it to the input circuit of the control module and also transmit a signal from said module to activate external AC lines, (i.e. an outside power supply) which in turn energizes said light.

In conjunction with the applicants' concurrently filed patent application entitled "Improved Continuous Weighing Mechanism For Fluids", it is also within the scope of the present invention that the above described control box 200 can also provide for the "mother" board to house a second control module (described in this latter mentioned patent application) which operates independent of the herein described control module, but it is, however, capable of activating the alternating current lines which in turn energizes other devices such as the light 202.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A temperature indicating device for use with a conduit system wherein a fluid material is moved and is weighed by a continuous weighing mechanism comprising (a) an adapter which is partially shaped to be detachably connected to said continuous weighing mechanism and incorporated into said conduit system on that portion of said continuous weighing mechanism where the fluid material passes therefrom, said adapter being provided with a nipple in the side wall thereof; (b) a sensing probe which is slideably mounted within said nipple, said sensing probe extending throughout the entire length of said nipple and into the interior portion of said adapter whereby the sensing probe will be in thermoconducting relation with the fluid material moving through said adapter; (c) a control module containing input and output circuits, disposed remotely from said sensing probe and interconnected therewith by suitable electrically conductive means, said control module adapted to receive a signal from said sensing probe through said input circuit and upon preset circuitry conditions, activate an outside electrical power supply through the said output circuit.

2. The apparatus as set forth in claim 1 wherein the adapter is larger in cross sectional area at the upper portion, which is detachably connected to said continuous weighing mechanism, than at the lower portion thereof.

3. The apparatus as set forth in claim 1 wherein said adapter is constructed of stainless steel and is substantially circular in cross sectional configuration.

4. The apparatus as set forth in claim 1 wherein said sensing probe is maintained in a contiguous relationship with said nipple because of the subatmospheric pressure conditions within said adapter when used in said conduit system.

5. The apparatus as set forth in claim 1 wherein the electrically conductive means includes a connector containing a trimming resistor and which connector is in electrical contact with said input circuit.

6. The apparatus as set forth in claim 1 wherein the control module comprises in combination (a) a trim resistor for calibrating an incoming electrical signal to standard value resistance; (b) three operational amplifiers for signal gain from said trim resistor; (c) a comparator amplifier which receives the signal from said three operational amplifiers; (d) a control transistor for receiving the output from said comparator amplifier; (e) an optical coupler which is energized by a signal from said control transistor; and (f) a triac which is operative via a pilot voltage through the optical coupler and which triac in turn activates said electrical power supply through said output circuit.

7. The apparatus as set forth in claim 6 and including a housing which is adapted to contain said control module and which housing is provided with a light which is interconnected with said control module by said output circuit.

8. The apparatus as set forth in claim 6 and including a housing which is adapted to contain said control module and which housing is provided with a bell which is interconnected with said control module by said output circuit.

9. In combination with a conduit system having an interposed housing through which a fluid material is moved, said housing containing an inlet thereto and an outlet therefrom, a temperature indicating device comprising (a) an adapter which is partially shaped to be detachably connected to said outlet and incorporated into said conduit system, said adapter being provided with a nipple in the side wall thereof; (b) a sensing probe which is slideably mounted within said nipple, said sensing probe extending throughout the entire length of said nipple and into the interior portion of said adapter whereby the sensing probe will be in thermoconducting relation with the fluid material moving through said adapter; (c) a control module containing input and output circuits, disposed remotely from said sensing probe and interconnected therewith by suitable electrically conductive means, said control module adapted to receive a signal from said sensing probe through said input circuit and upon preset circuitry conditions, activate an outside electrical power supply through said output circuit.

10. The combination as set forth in claim 9 wherein the adapter is larger in cross sectional area at the upper portion, which is detachably connected to said continuous weighing mechanism, than at the lower portion thereof.

11. The combination as set forth in claim 9 wherein said adapter is constructed of stainless steel and is substantially circular in cross sectional configuration.

12. The combination as set forth in claim 9 wherein said sensing probe is maintained in a contiguous relationship with said nipple because of the subatmospheric pressure conditions within said adapter when used in said conduit system.

13. The combination as set forth in claim 9 wherein the electrically conductive means includes a connector containing a trimming resistor and which connector is in electrical contact with said input circuit.

14. The combination as set forth in claim 9 wherein the control module comprises in combination (a) a trim resistor for calibrating an incoming electrical signal to standard value resistance; (b) three operational amplifiers for signal gain from said trim resistor; (c) a comparator amplifier which receives the signal from said three operational amplifiers; (d) a control transistor for receiving the output from said comparator amplifier; (e) an optical coupler which is energized by a signal from said control transistor; and (f) a triac which is operative via a pilot voltage through the optical coupler and which triac in turn activates said electrical power supply through said output circuit.

15. The combination as set forth in claim 14 and including a second housing which is adapted to contain said control module and which housing is provided with a light which is interconnected with said control module by said output circuit.

16. The apparatus as set forth in claim 14 and including a second housing which is adapted to contain said control module and which housing is provided with a bell which is interconnected with said control module by said output circuit.

17. In a continuous weighing mechanism for fluids moving through a conduit system comprising a housing providing a chamber having aligned cylindrical bearings carried by opposite walls thereof and formed at its top and bottom, respectively, with an inlet and an outlet, a receiver rockable through a fixed circular path and adapted in one predetermined position to receive fluid from the inlet and, when in a second predetermined position, to discharge the fluid by gravity for drainage through the outlet, a rotatable shaft whereon the receiver is mounted fast for said rocking movement with the turning of the shaft, the shaft and receiver being formed for cooperatively effecting said fast mounting while permitting the receiver to be freely separable from the shaft by a radial movement relative thereto, the shaft having end portions extended into the cylindrical bearings and having the portions lying the bearings of outwardly rounded form and closely journaled in an engaging in annular line contact with the bearings for free rotation therein under conditions of varying distortion and relative movement of the areas of the housing walls having the bearings therein, and a counter device connected with the shaft for operation thereby with each rotary movement thereof the improvement which consists of a temperature indicating device for use with said conduit system comprising (a) an adapter which is partially shaped to be detachably connected to said continuous weighing mechanism at said outlet thereof, said adapter being provided with a nipple in the side wall thereof; (b) a sensing probe which is slideably mounted within said nipple, said sensing probe extending throughout the entire length of said nipple and into the interior portion of said adapter whereby the sensing probe will be in thermoconducting relation with the fluid material moving through said adapter; (c) a control module containing input and output circuits, disposed remotely from said sensing probe and interconnected therewith by suitable electrically conductive means, said control module adapted to receive a signal from said sensing probe via said input circuit and upon preset circuitry conditions, activate an outside electrical power supply through said output circuit.

18. In a fluid system wherein is interposed a continuous weighing mechanism of the type which utilizes a gravity operated scale receiver supported for movement alternately between two positions and into which the fluid enters in the form of a continuous stream and from which it passes intermittently in said alternate movements in the form of separated batches, the improvement which consists in a temperature indicating device for use with said fluid system comprising (a) an adapter which is partially shaped to be detachably connected to said continuous weighing mechanism and incorported into said fluid system on that portion of said continuous weighing mechanism where the fluid passes therefrom, said adapter being provided with a nipple in the side wall thereof; (b) a sensing probe which is slideably mounted within said nipple, said sensing probe extending throughout the entire length of said nipple and into the interior portion of said adapter whereby the sensing probe will be in thermoconducting relation with the fluid moving through said adapter; (c) a control module containing input and output circuits, disposed remotely from said sensing probe and interconnected therewith by suitable electrically conductive means, said control module adapted to receive a signal from said sensing probe through said input circuit and upon preset circuitry conditions, activate an outside electrical power supply through the said output circuit.

* * * * *